Sept. 16, 1924.

F. L. BROUSSOUSE

BOGIE FOR ROLLING STOCK

Filed Feb. 21, 1923

1,508,954

INVENTOR
FERNAND L BROUSSOUSE
BY

ATTORNEYS

Patented Sept. 16, 1924.

1,508,954

UNITED STATES PATENT OFFICE.

FERNAND LOUIS BROUSSOUSE, OF PARIS, FRANCE.

BOGIE FOR ROLLING STOCK.

Application filed February 21, 1923. Serial No. 620,496.

*To all whom it may concern:*

Be it known that I, FERNAND LOUIS BROUSSOUSE, a citizen of the French Republic, and residing in Paris, Seine, France, 44 Rue de Lisbonne, have invented certain new and useful Improvements in and Relating to Bogies for Rolling Stock, of which the following is a complete specification.

This invention relates to bogies for rolling stock of any description, in which the frame is provided with lateral members receiving the truck bolster which carries the usual pivot. In my said invention, the said lateral members are constituted by the very springs of suspension of the bogie upon its axles, thus rendering possible to obtain a dead weight as small as possible, while complying with the main requirements of the traction, concerning stability, a good balancing, strength, and security and minimizing the necessary force for swinging the truck or bogie.

In the accompanying drawing which shows by way of example a constructional form of a bogie according to the present invention, more particularly intended to be applied to a passenger carriage:

Figure 1:
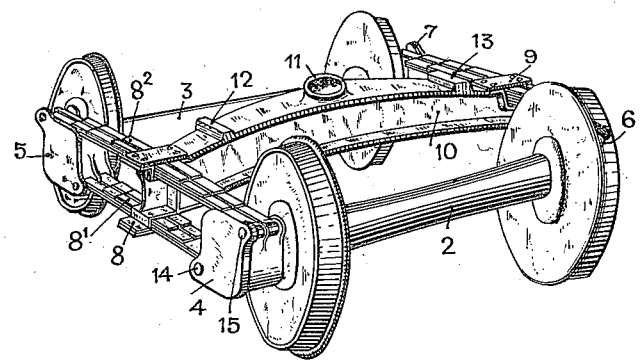
Fig. 1 is a perspective view of the bogie.

In the constructional form shown in the drawing, both axles of the bogie 2, 3 are provided at their ends with axle boxes 4, 5, and 6, 7 respectively, which boxes are connected in the longitudinal direction by means of two sets of plate springs 8, 9. A cross beam or bolster 10 rests upon both groups of springs 8, 9 which the said bolster connects together by means of any convenient means; the said bolster carrying a pivot 11 and the two usual truck side bearings 12, 13.

As it may be more particularly seen in Fig. 1, each lower group of springs, such as $8^1$ itself comprises two springs arranged side by side, which are resting upon the journal boxes 4, 5 through pivots such as 14, while the upper springs which are similarly divided into two groups $8^2$ are pivoted on pins 15 arranged in the journal boxes diametrally opposed to the pivots 14 relatively to the axis of the corresponding axle.

It is to be noticed that the side springs simultaneously constitute frame members and suspension members, for the propulsion and braking reactions are transmitted through the main plates of the said springs.

Figure 2:
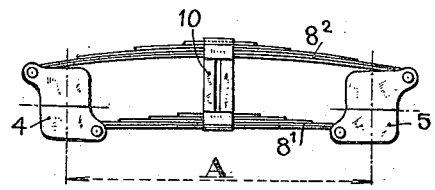
Figs. 2 and 3 show the side suspension springs in two different positions of operation.
Figure 3:
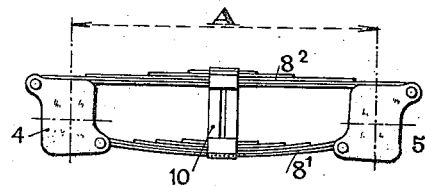

The combined curve of the plates of the spring groups $8^1$, $8^2$ is such that, as shown more particularly on Figs. 2 and 3 which show the said springs under tare and under maximum load respectively, it may be seen that the distance apart, (A) of the axle boxes, and consequently of the axles, is constant during the whole vertical flexion of the springs due to the load. As it may be seen, the lower spring $8^1$ being straight, and upper spring being cambered upwards for the position under tare, a lowering of the said springs determined by a load causes the connection points of the upper spring $8^2$ to be widened away and, at the same time the pivots of the lower spring $8^1$ to be brought nearer. This variation of tension of the said springs results in a pivoting of the axle boxes 4, 5 round their axes, that is to say round the axis of their respective axles, thus keeping the said axles at their normal distance apart.

The arrangement of the four springs on each side of the bogie, minimizes the drawbacks caused by an eventual breaking of a main plate, such accident, in fact, resulting only in a momentary overload of the three remaining undamaged springs, without causing a general damage.

The compact construction of the said bogie avoids the provision of guides for the axle boxes which always, in the rolling stock are a cause of disturbance owing to their rapid wear and the necessity of a frequent oiling.

The substitution of boxes provided with ball bearings for the ordinary boxes enables, with the said construction, to obtain a bogie which practically needs no repair.

What I claim is:

1. A bogie for rolling stock of any description, characterized by the fact that the side members of the bogie frame are constituted by the suspension springs of the said bogie, which are directly pivoted upon the axle boxes, and are provided with different curvatures and dimensions in order to maintain constant the distance apart of the axle boxes and consequently of the axles, whatever the flexion of the said springs may be.

2. A constructional form of the suspension springs according to claim 1, according to which each set of side springs comprises two groups of two springs, arranged at the upper part and at the lower part of the frame, respectively, the upper springs being bent upwards for the position under tare, and the lower springs being straight for the same position, in order to insure under a load, the lengthening of the upper spring and the shortening of the lower spring, thus causing a rocking or pivoting of the axle boxes around their own axes, without varying their distance apart.

3. A bogie according to claim 1, in which the said bogie, in its plan view, constitutes a frame having the shape of a double T, the central branch of which is rigid and receives the pivot of rotation, whilst the side branches are each constituted by two groups of suspension springs connected with the axle boxes.

4. In a bogie frame, pivoted axle boxes, and groups of springs arranged one above the other and pivoted to the axle boxes, the springs of each group comprising a plurality of springs arranged side by side.

5. A bogie frame, comprising two groups of springs for each side, the groups being arranged one above the other, and a cross beam secured to each group of springs at the center of their length.

6. A bogie frame comprising two groups of springs for each side, the groups being arranged one above the other and each group comprising a plurality of springs arranged side by side, and a cross beam secured to each group at the center of their length.

7. A bogie frame, comprising two groups of springs for each side, the groups being arranged one above the other and each comprising a plurality of springs arranged side by side, boxes adapted to be pivoted on the axles and to which the springs of each of the groups is pivoted, and a cross beam secured to each of the groups at the middle of their length.

In testimony I have hereunto set my hand.

FERNAND LOUIS BROUSSOUSE